(12) United States Patent
Yu

(10) Patent No.: US 6,602,556 B2
(45) Date of Patent: Aug. 5, 2003

(54) CERAMIC SHELL THERMAL SPRAY POWDERS AND METHODS OF USE THEREOF

(75) Inventor: Sung H. Yu, Shrewsbury, MA (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 0 days.

(21) Appl. No.: 10/210,252

(22) Filed: Aug. 1, 2002

(65) Prior Publication Data

US 2003/0129320 A1 Jul. 10, 2003

Related U.S. Application Data

(62) Division of application No. 09/941,226, filed on Aug. 28, 2001, now abandoned.

(51) Int. Cl.[7] .................................................. C23C 4/10

(52) U.S. Cl. ........................ 427/447; 427/453; 427/222; 427/227

(58) Field of Search ................................. 427/447, 453, 427/212, 222, 227

(56) References Cited

U.S. PATENT DOCUMENTS 4,450,184 A * 5/1984 Longo et al. ................ 427/453
5,530,050 A * 6/1996 Rangaswamy .............. 524/430
6,136,891 A * 10/2000 Chopin et al. .............. 523/204

* cited by examiner

Primary Examiner—Katherine A. Bareford
(74) Attorney, Agent, or Firm—Joseph P. Sullivan

(57) ABSTRACT

Plasma spraying a substrate using particles having a ceramic coating on a combustible core, which may optionally be burned out before spraying, gives a potential for a thicker more conformable protective coat.

16 Claims, 2 Drawing Sheets

CERAMIC SHELL THERMAL SPRAY POWDERS AND METHODS OF USE THEREOF

This application is a divisional of application U.S. Ser. No. 09/941,226, filed on Aug. 28, 2001, now abandoned.

BACKGROUND OF THE INVENTION

The present invention relates to the use of powders in the form of a ceramic shell that may optionally be filled or void in the production of thermally sprayed coatings on substrates.

It is well known that placing a temperature-resistant ceramic coating on a substrate can enable the substrate to withstand higher temperatures without deterioration and this has become a common way of protecting substrates as diverse as molds used for casting metals and in the hot zones of turbine engines such as for example on turbine blades for jet engines. The coatings can be applied by a number of techniques but the most frequently used is based on the use of a thermal spray in which the ceramic particles are injected into a plasma jet directed towards the substrate. The heat of the plasma jet melts the ceramic particles and causes them, upon impact with the substrate, to form a ceramic layer with a high degree of uniformity and integrity that is capable of protecting the substrate on which it is coated, giving the substrate the superficial thermal and wear characteristics of the ceramic with which it is coated.

There is however a problem when it is desired to use a thickness of coating that is more than about 250 micrometers in thickness since there is a tendency for the coating to spall off the substrate, especially if there is extensive thermal cycling or if the coated substrate is subjected to impacts. Spalling can also occur during spraying of the powder. This is believed to be due at least in part to a certain lack of conformity of the sprayed material with the surface of the substrate. One way to handle this problem is to use a thermal spray in which polymer particles are injected into the cooler part of a plasma flame while ceramic particles are injected into the hotter part leading to co-deposition of polymer and ceramic particles. This process, which is described in U.S. Pat. No. 6,051,279, gives the layer a degree of ability to absorb strains and to survive conditions that would lead to spalling of a purely ceramic layer. It is thus possible to deposit much greater thicknesses of protective coating. As might be imagined however, there is great difficulty in controlling the temperature of the flame and the rates of injection so as to get a uniform coating. It is also known to plasma spray hollow ceramic oxide particles though the method by which such particles are made does not preserve the hollow structure to any significant degree and these also suffer from uniformity problems and spalling when coatings with significant thicknesses, (over about 250 micrometers), are attempted.

The problem is magnified further when the ceramic to be deposited is zirconia. As is well known in the art, the tetragonal form of zirconia is the high temperature stable form and that, as the temperature declines below the transition temperature, the zirconia changes the crystalline structure to the monoclinic form, which is the low temperature-stable form, and undergo dimensional and volume changes. Thus under plasma spray conditions the zirconia will be in the tetragonal form but will on cooling revert to the monoclinic form and this leads to a source of imperfections in the coating. Indeed such coatings are quite unable to stand any significant thermal cycling to a point above the transition temperature to the tetragonal form. It is however known that some metal oxides such as magnesia, yttria and certain transition metal oxides have the capability of stabilizing the zirconia in the tetragonal form during such thermal cycling and it is known to add such oxides in admixture with zirconia to the plasma flame. This however produces inhomogeneities of the zirconia structure as a result of incomplete stabilization and this too has its problems.

There is therefore a need for a process for the production of thermally sprayable ceramic powders that can be deposited to form protective layers that are relatively thick (such as 250 micrometers or more) on a substrate and the present invention provides just such a process.

GENERAL DESCRIPTION OF THE INVENTION

The present invention provides a process for coating a substrate which comprises:

a) forming a suspension comprising ceramic particles and particles of a combustible material in which the average particle sizes of the combustible and ceramic components are in a ratio of from 100:1 to 5:1 and the combustible particles have an average particle size of from 10 to 500 micrometers;

b) granulating the suspension, for example by spray drying, to form composite particles in which the particles of combustible material are coated with the particles of the ceramic; and c) plasma spraying the composite particles on to the substrate.

The composite particles obtained can be used to coat a substrate allowing a much greater thickness of coating to be obtained and, if the nature of the combustible material is chosen appropriately, a coating with much greater conformability to the substrate and therefore a much reduced danger of a coating subject to spalling.

Alternatively the composite particles can be heated in a furnace at a temperature high enough to burn out the combustible material leaving stable hollow ceramic particles. These can then be used directly to build up plasma sprayed protective coatings in which the particles are fed directly into a plasma flame at a temperature sufficient to melt the ceramic and are deposited as a layer on a substrate.

The ceramic layer can be any of the ceramic oxides used for such purposes including but not limited to zirconia, yttria-stabilized zirconia, alumina, chromia, magnesia and mixtures of such oxides including spinel structures.

The combustible material is preferably a polymer that is stable at temperatures of at least 100° C., and more preferably above about 300° C., such as for example polyesters, nylon, polyimides and polycarbonates. It can also be for example a readily combustible finely divided organic material powder such as walnut shell flour or wood powder.

The ceramic-shelled particles for use in a preferred process according to the invention are made by mixing particles of a combustible polymer component and a ceramic oxide component in the form of stable aqueous dispersions and forming the dispersed mixture into composite particles in which the ceramic particles are coated upon the polymer particles, for example by spray drying or by one of the spray granulation processes known in the art. Stability of the dispersion is preferably enhanced by the use of a surfactant and the adhesion of the ceramic particles to the polymer particles is most suitably facilitated by the use of a temporary binder. The ceramic oxide particle size is smaller than that of the polymer particles such that the ceramic particles form a uniform coat around the polymer particles. Typical polymer average particle sizes in polymer dispersions are from 10 to about 500 micrometers, such as from 50 to 400 micrometers, and most preferably from 100 to 300 micrometers. The ceramic oxide particles have average particle sizes that are from 0.5 to 100 micrometers, such as from 1 to 50 and preferably from 5 to 20 micrometers. In the context of this Application, "average particle size" shall mean the volume average particle size as determined for example using a "MICROTRAC" laser light scattering device. In a preferred embodiment of the invention the volume proportions of ceramic and polymer are from 1:100 to 1:5 and preferably from 1:20 to 1:10.

DRAWINGS

DETAILED DESCRIPTION OF THE INVENTION

Figure 1:
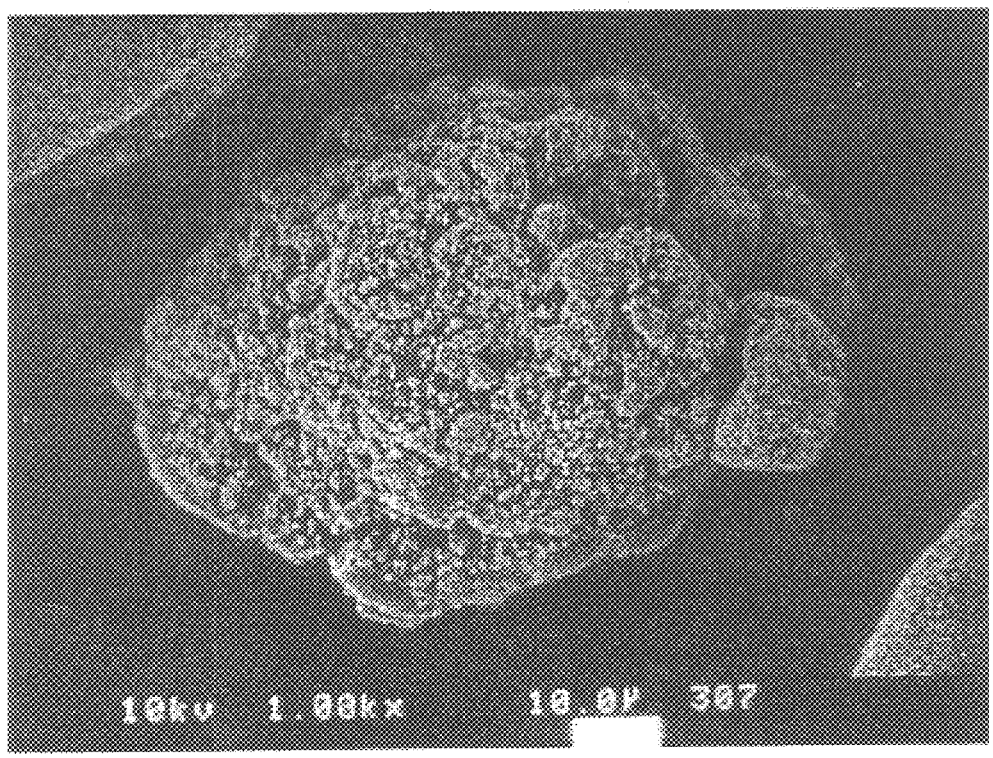
FIG. 1 shows a photograph of polymer particles coated with ceramic particles.
Figure 2:
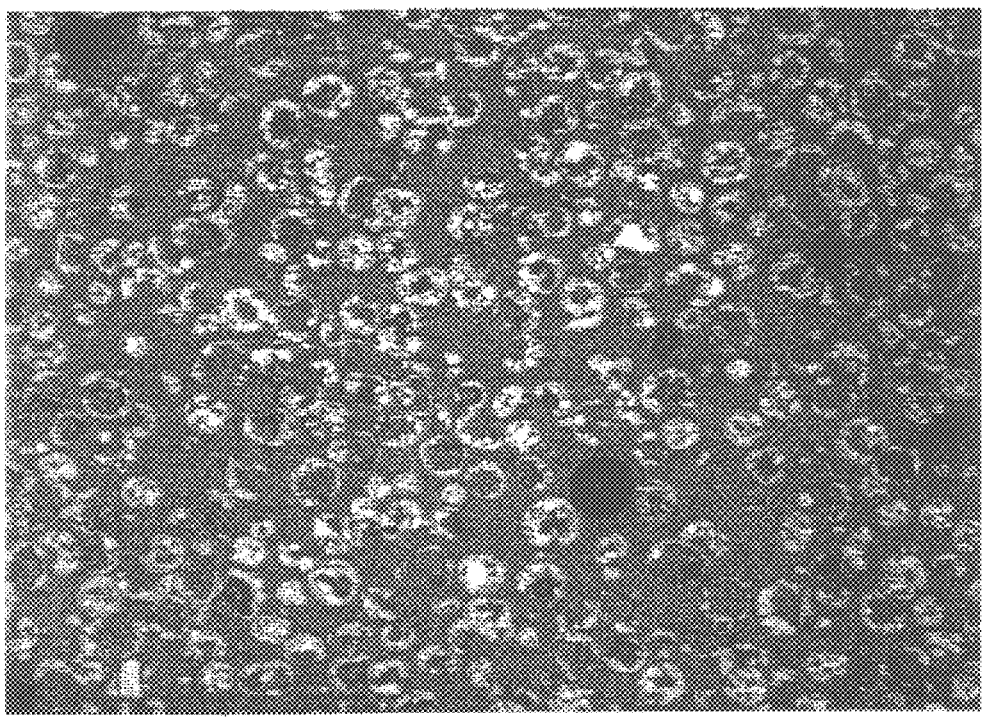
FIG. 2 shows a photograph of hollow particles left after particles like those illustrated in FIG. 1 had been sintered.

The most challenging environments for which the present invention is intended are those in which a substrates require the protection of a highly inert, temperature resistant, dimensionally stable ceramic coating that can withstand extensive thermal cycling both in terms of temperature and frequency. The ceramic material that is most suitable for this application is yttria-stabilized zirconia. The amount of yttria required to stabilize the zirconia in the tetragonal form is usually from about 0.5% to about 20% by weight and most frequently from 6 to 8% by weight for thermal barrier coatings. In other applications a lower yttria range can be preferred, such as from 2 to 4% by weight of the combined weight of zirconia and yttria.

The stabilized zirconia can be readily obtained by feeding a powder mixture of zirconia and yttria in the desired proportions into a plasma flame and collecting the resulting particles. Alternatively a melt of the oxides in the desired proportions can be poured into a cooling fluid jet such that the melt condenses as ceramic particles of relatively small size. Often some degree of milling is required to generate the appropriate particle size. In other processes the particle size can be achieved without milling by spray-drying process optionally followed by a sintering operation.

Although the invention has particular utility in the production of coatings of stabilized zirconia ceramic coated polymer particles, the ceramic can be selected from a wide range of other ceramic materials such as alumina, chromia, silica, ceria and magnesia and ceramic spinels depending on the desired physical or chemical properties of the coating to be applied. Suitable selection of the materials could adapt the coated particles for use also as insulation or coating products. It is also possible to produce hollow particles by burning out the core component where this is combustible. Such particles would have obvious advantage in terms of insulation potential and light weight.

In the cases in which the combustible particles are polymeric the polymer particles can be obtained directly in some cases using an emulsion or suspension polymerization technique. More usually however they are obtained by milling larger particles. A particularly suitable polymer is a polyester sold by Saint Gobain Performance Plastics under the tradename "Ekonol". Other polymers however as indicated above are also suitable. Where non-polymeric combustible particles are used, these can be selected from organic materials which are available in fine powder form such as are commonly used to generate internal porosity for example in ceramic catalyst support systems. These include ground walnut shells, sawdust and naphthalene particles.

The ceramic coated particles are made most conveniently by a process in which ceramic particles are caused to adhere to the outer surface of a combustible particle. With normal ceramics and combustible materials such as polymers this is not readily accomplished without a little help. The ceramic surface is often somewhat hydrophilic but an organic surface is typically at least somewhat hydrophobic. The solution to this problem is to coat the organic particle with a surface active agent with a hydrophobic portion and a hydrophilic portion. A typical example would include an organosilane derivative which comprises a number of hydroxyl groups which readily adhere to ceramic oxides and also an organic group which is compatible with organic polymers. Other suitable surface active agents, (or surfactants), include alkali metal salts of long chain fatty acids or alkyl sulfonic acids and long chain organic alcohols.

The formulation can also with advantage comprise additives that stabilize the dispersion against settling, antifoaming additives, and a minor amount of a temporary binder that helps the ceramic particles adhered to the combustible organic particles remain adhered while the composite particles are being manipulated. This binder is of course burned off if the combustible organic particle is removed in a firing operation or, if the composite particle itself is plasma sprayed, when the coated particle is thermally sprayed and the ceramic particles melt and flow together to form a coherent coating on the polymer particle. Suitable binders include low molecular weight polyvinyl acetate or polyvinyl alcohol. Other suitable binders include other low molecular weight thermoplastic resins such as diene rubber polymer and copolymer latices.

The dispersion of surfactant coated combustible organic particles is mixed with a stable dispersion of the ceramic and the components are thoroughly mixed to form a dispersion with a solids content that comprises from about 50 to about 80% and most preferably from 55 to 75% by weight of the solids. The medium in which the components are mixed is most conveniently water though other media can be considered providing the nature of the surfactant is modified accordingly. The combined mixture is then passed through a spray dryer to form a dry powder of ceramic oxide-coated combustible organic particles.

EXAMPLE 1

In this Example the basic invention is described as applied to the production of a coating of particles comprising polyester particles coated with stabilized zirconia ceramic layer.

Preparation of the Coated Particles

A 60% solids aqueous dispersion comprising 5.8 wt %, (20 vol %), of a polyester available from Saint Gobain Performance Plastics under the tradename "Ekonol"; 94.2 wt % of yttria-stabilized zirconia, (8 wt % yttria); 0.25 wt % of a surfactant available from Vanderbilt Co. under the trademark "DARVAN®" 821A; 0.25 wt % of a surfactant available from Atlas Powder under the trademark "BRIJ®" 35; 2 wt % of a polyvinyl alcohol temporary binder; and a drop of an antifoam agent available from Air Products under the trademark "TYGO®".

The average particle size of the stabilized zirconia particles was about 5 micrometers and the average particle size of the Ekonol polyester particles was about 50 micrometers.

The dispersion was spray dried using a Niro model #SD 6.3-R using an inlet temperature of 126.7° C. and an outlet temperature of 51.7° C. and a disc atomizer run at 480 Hz. The fine powder obtained was examined and was found to have a loose pack density (LPD) of 1.19 g/cc and the particle size diameters showed a pattern as follows: $D_{10}$ 30.94 micrometers; $D_{50}$ 63.28 micrometers; and $D_{90}$ 104.06 micrometers. A photograph of these particles is shown as FIG. 1. From this the polyester cores, each surrounded by ceramic particles, are clearly visible.

A similar product to that shown in FIG. 1 and having a LPD.of 2.32 g/cc was placed in a static furnace at a temperature of 1450° C. for 60 minutes. This had the effect of burning out the polymer core and left a product with a LPD of 1.39 g/cc. The hollow particles therefore had a density 40% lower than the starting product. Lower density products are usually associated with higher deposit efficiencies, by which is meant that a greater proportion of the ceramic material plasma sprayed on a substrate actually adheres to the substrate.

I claim:

1. A process for coating a substrate which comprises:
   a) forming a suspension comprising ceramic particles and particles of a combustible material dispersed in a liquid medium in which the average particle sizes of the combustible and ceramic components are in a ratio of from 100:1 to 5:1, the combustible particles have an average particle size of from 10 to 500 micrometers, and the volume proportions of ceramic particles to combustible particles is from 1:100 to 1:5;
   b) granulating the suspension to form composite particles in which the particles of combustible material are coated with the particles of the ceramic; and
   c) plasma spraying the composite particles on to the substrate.

2. A process according to claim 1 in which the composite particles are subjected to a temperature sufficient to burn out the combustible material before the particles are plasma sprayed on to the substrate.

3. A process according to claim 2 in which the suspension is granulated by spray drying.

4. A process according to claim 2 in which the ceramic particles have an average particle size of from 0.5 to 100 micrometers.

5. A process according to claim 2 in which the ceramic particles are selected from the group consisting of zirconia, yttria-stabilized zirconia, alumina, chromia, magnesia and mixtures thereof including spinel structures comprising such oxides.

6. A process according to claim 5 which the ceramic particles are formed from yttria-stabilized zirconia.

7. A process according to claim 2 in which the combustible particles are polymeric.

8. A process according to claim 7 in which the combustible particles are formed from a polyester.

9. A process according to claim 2 in which the combustible particles have an average particle size of 50 to 400 micrometers.

10. A process according to claim 1 in which the suspension is granulated by spray drying.

11. A process according to claim 1 in which the ceramic particles have an average particle size of from 0.5 to 100 micrometers.

12. A process according to claim 1 in which the ceramic particles are selected from the group consisting of zirconia, yttria-stabilized zirconia, alumina, chromia, magnesia and mixtures thereof including spinel structures comprising such oxides.

13. A process according to claim 12 in which the ceramic particles are formed from yttria-stabilized zirconia.

14. A process according to claim 1 in which the combustible particles are polymeric.

15. A process according to claim 14 in which the combustible particles are formed from a polyester.

16. A process according to claim 1 in which the combustible particles have an average particle size of 50 to 400 micrometers.

* * * * *